(12) United States Patent
Lee

(10) Patent No.: US 8,306,404 B2
(45) Date of Patent: Nov. 6, 2012

(54) MOBILE COMMUNICATION TERMINAL AND OPERATION CONTROL METHOD THEREOF

(75) Inventor: Seok Jun Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 1523 days.

(21) Appl. No.: 11/567,698

(22) Filed: Dec. 6, 2006

(65) Prior Publication Data

US 2007/0167152 A1 Jul. 19, 2007

(30) Foreign Application Priority Data

Dec. 6, 2005 (KR) .................. 10-2005-0118282

(51) Int. Cl.
*H04N 5/783* (2006.01)
*H04N 5/77* (2006.01)
(52) U.S. Cl. ..................... 386/343; 386/362
(58) Field of Classification Search ................ None
See application file for complete search history.

(56) References Cited

U.S. PATENT DOCUMENTS

| | | | |
|---|---|---|---|
| 6,278,497 B1 * | 8/2001 | Sumiyoshi et al. | 348/722 |
| 7,046,161 B2 * | 5/2006 | Hayes | 340/825.69 |
| 7,124,951 B2 * | 10/2006 | Hamilton et al. | 235/472.01 |
| 7,356,334 B2 * | 4/2008 | Yamashita | 455/420 |
| 7,489,853 B2 * | 2/2009 | Takahashi | 386/248 |
| 2001/0046190 A1 | 11/2001 | Miyazaki | |
| 2002/0069218 A1 | 6/2002 | Sull et al. | |
| 2005/0069283 A1 | 3/2005 | Mitsuyu | |
| 2005/0114897 A1 | 5/2005 | Cho et al. | |
| 2005/0239446 A1 * | 10/2005 | Tagawa et al. | 455/414.1 |
| 2007/0111717 A1 * | 5/2007 | Mueller et al. | 455/418 |

FOREIGN PATENT DOCUMENTS

| | | |
|---|---|---|
| EP | 0 999 504 A1 | 5/2000 |
| EP | 1 369 871 A2 | 12/2003 |
| EP | 1 587 108 A2 | 10/2005 |
| JP | 09-198853 | 7/1997 |
| JP | 2001-257968 | 9/2001 |

* cited by examiner

*Primary Examiner* — Gelek W Topgyal
(74) *Attorney, Agent, or Firm* — Lee, Hong, Degerman, Kang & Waimey

(57) ABSTRACT

The present invention relates to a mobile communication terminal and operation control method thereof: A mobile communication terminal according to the present invention comprises: an input unit having at least one searching keys specified for a section search of multimedia data; and a controller allocating the searching keys to predetermined reproducing positions of the multimedia data, respectively, and controlling reproducing time points of the multimedia data to be moved to reproducing positions allocated to the searching key if the searching keys are input. The present invention uses the searching keys specified for the section search upon reproducing the multimedia data to rapidly perform the section search, making it possible to easily use products regarding a mobile communication terminal.

12 Claims, 5 Drawing Sheets

MOBILE COMMUNICATION TERMINAL AND OPERATION CONTROL METHOD THEREOF

CROSS REFERENCE TO RELATED APPLICATION

This application claims the benefit of Korean Application No. 2005-118282, filed on Dec. 6, 2005, in the Korean Intellectual Property Office, the disclosure of which is incorporated herein by reference.

BACKGROUND OF THE INVENTION

1. Field of the Invention

The present invention relates to a mobile communication terminal and an operation control method thereof, and more particularly, to a mobile communication terminal and an operation control method thereof capable of rapidly searching desired reproducing sections or scenes by moving reproducing time points of multimedia data to places previously allocated to specified keys, if the specified keys are input for a section search.

2. Description of the Related Art

A mobile communication terminal such as a cellular phone, etc., is trending to become an individual necessary item. Accordingly, a mobile communication terminal, which is capable of reproducing multimedia data by including functions to reproduce moving pictures or music data such as MP3 in addition to a basic call function, has been developed.

In a mobile communication terminal capable of reproducing such multimedia data, a user can reproduce multimedia data by operating key pads or an earphone remote controller. At this time, a user uses searching keys specified for a section search in order to search desired reproducing sections or scenes from the multimedia data to be reproduced. The reproducing time points of multimedia data to be reproduced in a mobile communicant terminal move in accordance with the input of such searching keys so that a user can perform a desired search.

However, in a conventional mobile communication terminal capable of reproducing multimedia data, searching keys specified for a section search should repeatedly be operated several times for searching user's desired reproducing sections or scenes. In other words, reproducing time points of multimedia data should be moved in sequence by continuously inputting searching keys until a user reaches desired reproducing sections in multimedia data.

Therefore, it takes a lot of time for a user to search desired reproducing sections or scenes, etc. in multimedia data as well as a repetitive operations of searching keys are needed, causing inconvenience in use.

SUMMARY OF THE INVENTION

Therefore, the present invention is to provide a mobile communication terminal that can rapidly and simply search desired reproducing sections or scenes in reproducible multimedia data, and an operation control method thereof.

In order to accomplish the above, a mobile communication terminal according to the present invention comprises: an input unit having at least one searching keys specified for a section search of multimedia data; and a controller allocating the searching keys to predetermined reproducing positions of the multimedia data, respectively, and controlling reproducing time points of the multimedia data to be moved to the reproducing positions allocated to the searching keys, if the searching keys are input.

Also, an operation control method of a mobile communication terminal according to the present invention comprises: specifying at least one searching keys for a section search of multimedia data; allocating the searching keys to predetermined positions of the multimedia data, respectively; and moving reproducing time points to reproducing positions allocated to the searching keys, if the searching keys are input.

BRIEF DESCRIPTION OF THE DRAWINGS

The accompanying drawings, which are comprised to provide a further understanding of the invention and are incorporated in and constitute a part of this specification, illustrate embodiments of the invention and serve to explain the principles of the invention, together with the description. In the drawings.

DETAILED DESCRIPTION OF THE INVENTION

Figure 1:
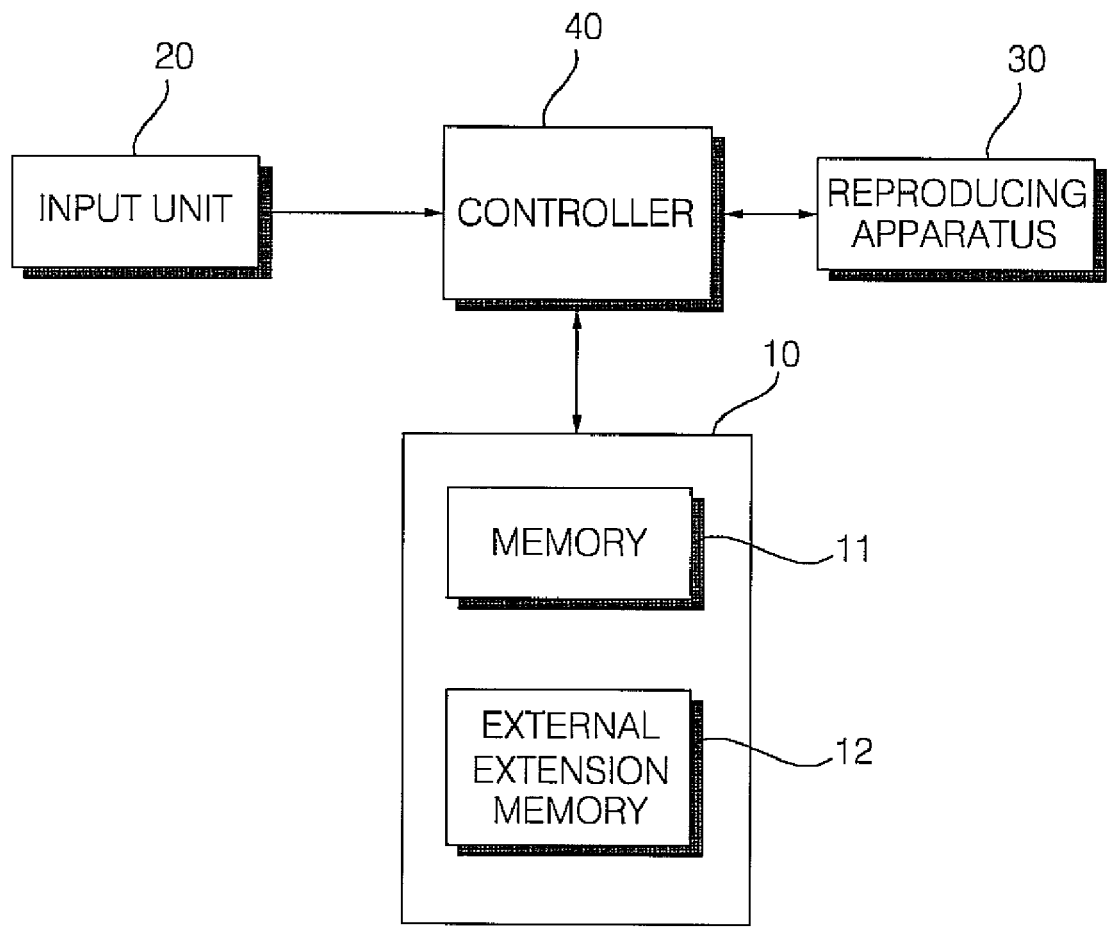
FIG. 1 is a block diagram showing a construction of a mobile communication terminal according to the present invention.

Hereinafter, the present invention will be described in more detail with reference to the attached drawings. Like reference numerals denote like elements in different drawings.

FIG. 1 is a block diagram showing a construction of a mobile communication terminal according to the present invention.

Referring to FIG. 1, a mobile communication terminal of the present invention comprises a storage unit 10, an input unit 20, a reproducing apparatus 30, and a controller 40.

Reproducible multimedia data are stored in and output from the storage unit 10. As the storage unit 10, an internal memory provided in the inside of the mobile communication terminal or an external extension memory detachable to the mobile communication terminal can be used.

The input unit 20 comprises a plurality of keys (not shown) having number keys and function keys, and side keys (not shown) provided in a side, etc., of a main body to control a telephone voice, etc. The input unit 20 can be implemented as a touch screen, a touch pad, a soft key, etc., other than key pads. A multimedia data reproducing list display instructions and a multimedia data reproducing instructions, etc., are input through the input unit 20. Also, at least one of the keys provided in the input unit 20 is specified and used as searching keys for a section search.

The reproducing apparatus 30 reproduces moving pictures or multimedia data including music data, etc. stored in the storage unit 10 according to the control of the controller 40. The controller 40 controls the whole operations of the mobile communication terminal by controlling the operations of each unit.

According to the construction, the controller 40 controls the multimedia data reproducing list display instructions to be input through the input unit 20, and a list of the multimedia data stored in the storage unit 10 to be displayed. And, the respective searching keys specified in predetermined reproducing positions are allocated within reproducing sections of the multimedia data selected from the displayed file list.

The controller 40 controls the reproducing apparatus 30 so that the multimedia data selected according to reproducing instructions input through the input unit 10 are reproduced. And, if the searching keys are input during the reproduction of the selected multimedia data, the controller 40 controls reproducing time points of multimedia data in the process of reproduction to be moved to reproducing positions allocated to the corresponding searching keys.

Figure 2:
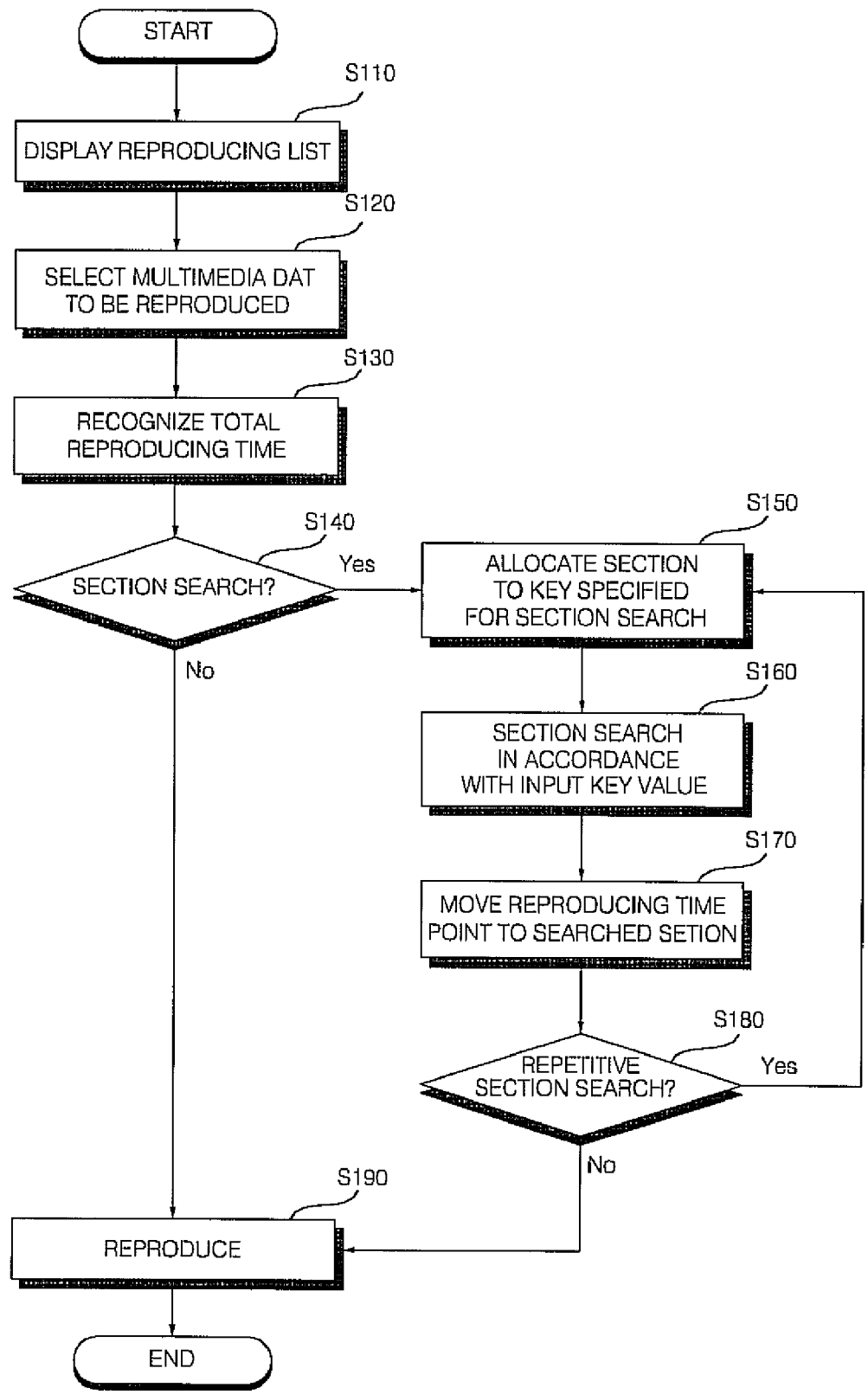
FIG. 2 is a flow chart showing an operation control method of a mobile communication terminal according to the present invention.

FIG. 2 is a flow chart showing an operation control method of a mobile communication terminal according to the present invention. An operation control method of a mobile communication terminal according to one embodiment of the present invention will be described with reference to FIGS. 1 and 2.

First, if the multimedia reproducing list display instructions are input through the input unit 10, a reproducible multimedia data reproducing list is displayed on a screen of a reproducing apparatus 30 (S110). In other words, if the multimedia reproducing list display instructions are input through the input unit 10 to be transferred to the controller 40, the controller 40 controls the generated reproducing list to be displayed on the screen of the reproducing apparatus 30 with reference to the multimedia data stored in the storage unit 10.

A user selects multimedia data to be reproduced from the multimedia reproducing list displayed on the screen of the reproducing apparatus 30 through the input unit 20 (S120). Accordingly, the controller 40 prepares the reproduction for the selected multimedia data, and recognizes the total reproducing time for the selected multimedia data (S130). And, the controller 40 allows the selected multimedia data to be reproduced by applying them to the reproducing apparatus 30.

If a user wants a section search for the multimedia data to be reproduced, a process of the section search is proceeded (S140). At this time, any one of searching keys specified for a section search is input in the input unit 20.

During the process of a section search, the controller 40 allocates reproducing positions to searching keys specified for a section search (S150). In this case, the reproducing positions to be allocated to searching keys can be set variously. For example, assuming that the total reproducing time of the selected multimedia data is 240 seconds and the searching keys specified for a section search in the input unit 20 are number keys from 0 to 9, the controller can distribute a total reproducing time in proportion to the number of the searching keys and allocate the respective searching keys to the reproducing positions corresponding to the distributed time. In other words, the controller 40 can allocate the reproducing positions corresponding to 24 seconds to the respectively specified searching keys by dividing 240 seconds that is the total reproducing time by 10 that is the number of the specified searching keys. According to such an allocation, if the inputting key of number 1 is input, a reproducing time point is moved to 24 seconds after the original reproducing time point, and if the inputting key of number 2 is input, a reproducing time point is moved to 48 seconds after on the basis of the original reproducing time point, The controller 40 allocates again reproducing positions to the specified searching keys in the manner as above, if the total reproducing time of multimedia is changed.

If the reproducing positions are allocated to the specified searching keys, the controller 40 performs a section search in accordance with the values of the input searching keys (S160). And, the reproducing time points of the multimedia data in the process of reproduction are moved to the searched sections in accordance with the values of the input searching keys (S180). For example, the controller 40 controls a reproducing time point to be moved to 24 seconds after the original reproducing time point if the inputting key of number 1 is input, and a reproducing time point to be moved to 48 seconds after the original reproducing time point if the inputting key of number 2 is input. At this time, the controller 40 can display the process of a section search on a screen.

If the searching keys specified for a section search are input again, the controller 40 repeatedly performs the process of the section search by returning to the step S150 (S150 to S180). If the process of the section search is completed, the controller 40 performs a reproduction for the subsequent parts (S190).

During the process of a section search, in order to more finely move the reproducing time points of multimedia data, it is possible to specify keys other than the searching keys specified for the section search in the input unit 20 as fine searching keys, and to move a reproducing time point in a time unit smaller than that of the searching key. For example, in the case that the respective reproducing positions corresponding to 24 seconds are allocated to the inputting keys of 0 to 9 in the S150 step, the reproducing time points can be moved to the reproducing positions corresponding to the time unit smaller than that of the section of the specified searching key, for example, 5 or 10 seconds, by using the side keys provided in the side of the main body of the mobile communication terminal as fine searching keys. In this case, if the inputting key of number 1 is input, a reproducing time point is moved to 24 seconds after the original reproducing time point. And, if the side keys are input in this state, the reproducing time points can be moved again after 5 or 10 seconds from the reproducing time point after 24 seconds. Therefore, a finer section search can be made by using the fine searching keys.

Figure 3:
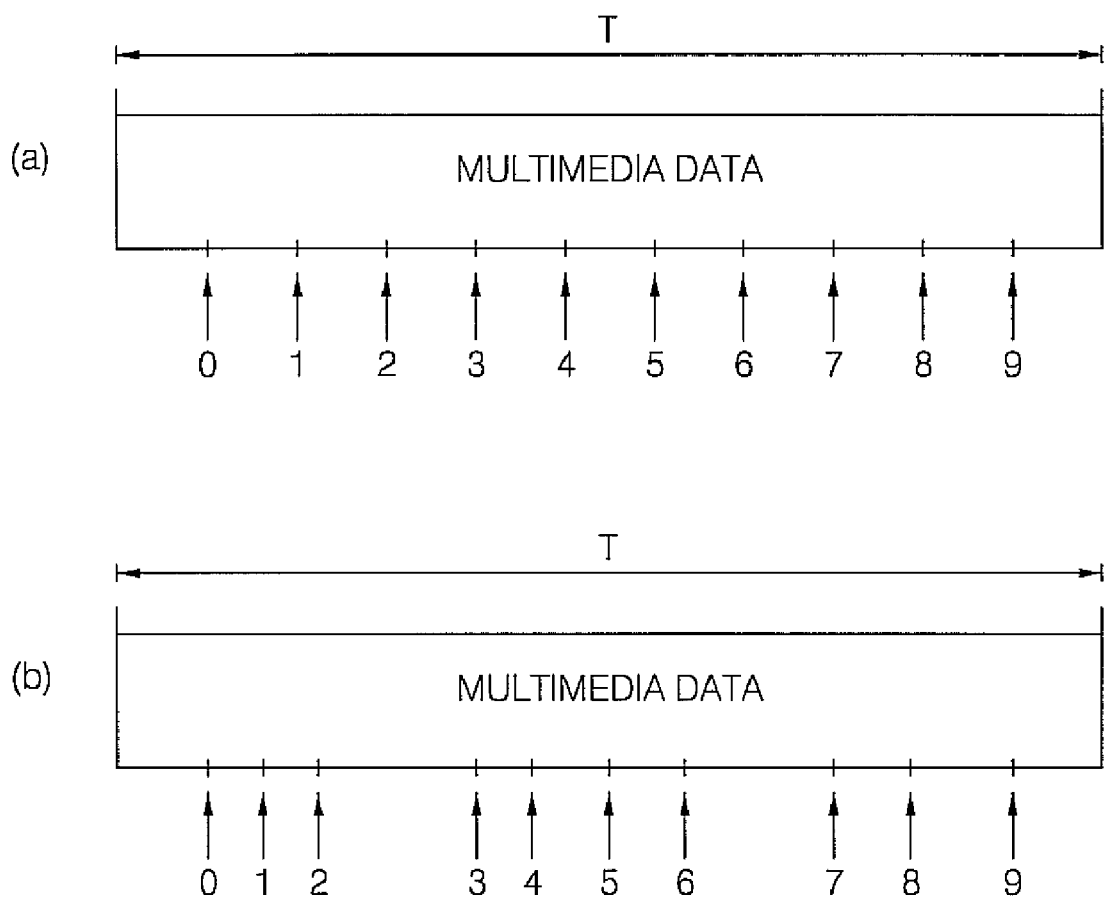
FIG. 3 is a diagram for explaining reproducing positions to be allocated to searching keys in an operation control method of a mobile communication terminal according to the present invention.

Meanwhile, as shown in FIG. 3($a$), although the embodiment describes the case that the reproducing positions corresponding to uniform sections are distributed to the searching keys specified for a section search, the reproducing positions corresponding to the sections having different sizes with each other can be allocated to the respective searching keys, as shown below.

In other words, as shown in FIG. 3($b$), a user can individually select reproducing positions allocated to searching keys. In this case, in the step S150, the controller 40 can display a screen on which the total reproducing time can be displayed and one of an automatic section search and a manual section search can be selected.

If the automatic section search is selected, the uniform sections are allocated to the searching keys, as described in the embodiment. However, if the manual section search is selected, sections to be allocated to the searching keys are arbitrarily set. In this case, for the total reproducing time, the controller 40 displays a screen to input the time to be allocated to the respective searching keys, and a user inputs time to the respective searching keys, thereby being capable of setting sections.

For example, assuming that the total reproducing time of multimedia is 240 seconds, and the inputting keys of 0 to 9 are used as searching keys specified for a section search, the corresponding reproducing positions can differently be set according to the respective searching keys, by setting 24 seconds on the inputting key of number 1 and arbitrarily setting time such as 10 seconds on the inputting key of number 2. Therefore, according to a user's purpose, the reproducing time points can be moved in a desired interval.

Figure 4:
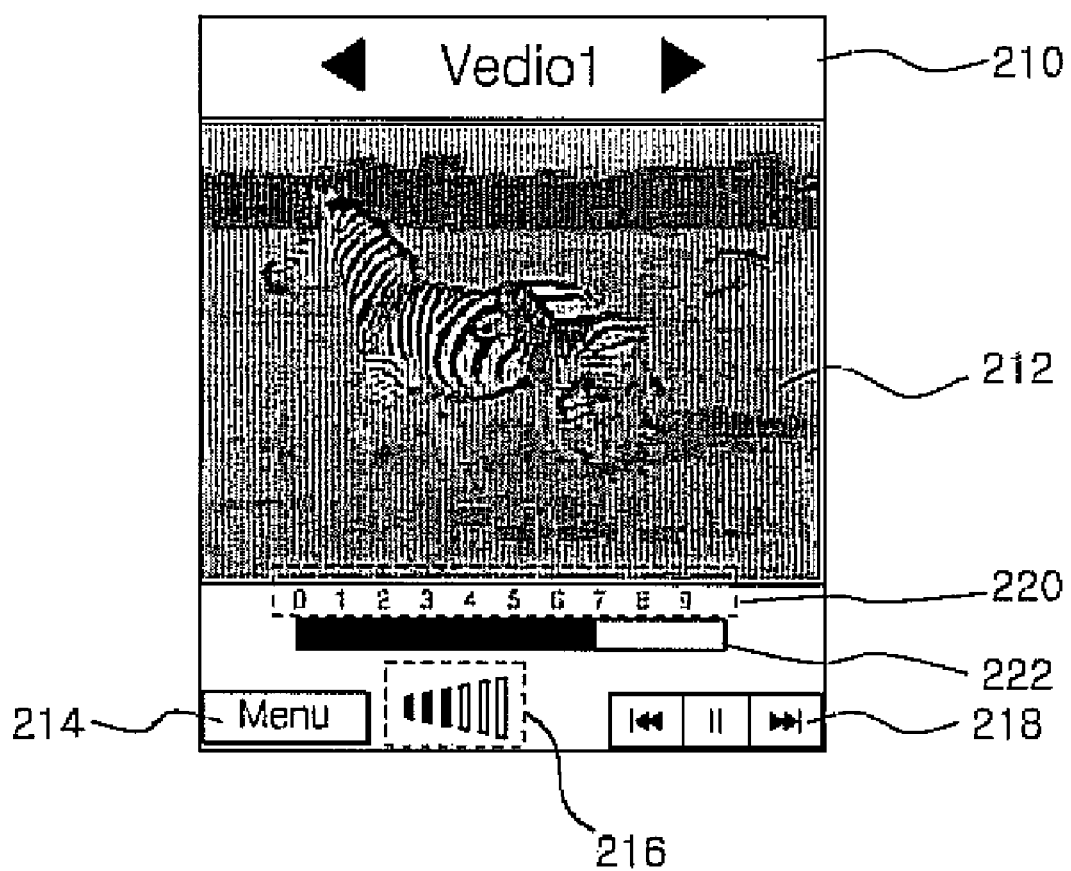
FIGS. 4 and 5 are diagrams referenced for explaining an operation control method of a mobile communication terminal according to the present invention, together with a screen displayed on a reproducing apparatus.
Figure 5:
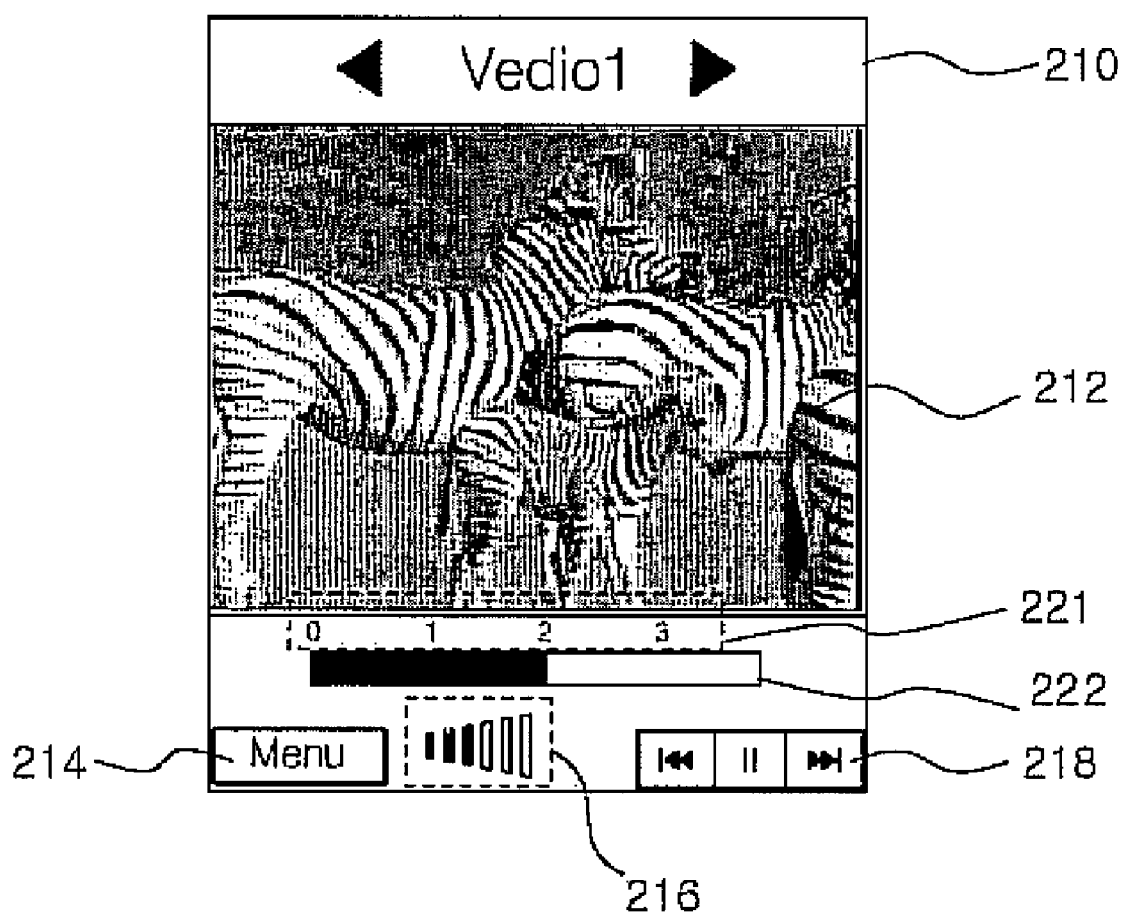

FIGS. 4 and 5 are diagrams referenced for explaining an operation control method of a mobile communication terminal according to the present invention, together with a screen displayed on a reproducing apparatus.

Referring to FIGS. 4 and 5, represents a state that multimedia data are reproducing on a screen, a file name 210 of the multimedia data currently reproducing is displayed on the upper of the screen and a reproducing screen 212 of the multimedia data is displayed on the middle of the screen. On the lower of the screen a menu selection 214 relating to the reproduction of the multimedia data, an icon 216 displaying a volume state, and an icon 218 for selecting a production, stop and a high speed reproduction are displayed.

Also, on the lower of the screen a progressive bar 222 displaying a reproduced time and a remaining time of the multimedia data currently reproducing is displayed, and on the upper of the progressive bar 222 searching keys for a section search and reproducing positions 220 and 221 allocated in the respective searching keys is displayed.

FIG. 4 shows a case that number keys from 0 to 9 are disposed in a reproducing section in a uniform interval, and FIG. 5 shows a case that number keys from 0 to 3 are disposed in a reproducing section in a uniform interval. A user may input any one of the specified searching keys to move it to a desired position.

As described above, by displaying the searching keys and the reproducing positions 220 and 221 allocated in the respective searching keys on the progressive bar of the multimedia data to be reproduced, a user may easily know the specified searching key and the reproducing position corresponding thereto.

As described above, the present invention recognizes the total reproducing time before/after the reproduction of reproducible multimedia data and allocates the reproducing positions to the searching keys specified for a section search in accordance with the total reproducing time so that it can rapidly and simply perform a section search for multimedia data by using the searching keys. Therefore, the convenience of the mobile communication terminal in use is enhanced.

While the invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A mobile communication terminal, comprising:
an input unit comprising at least two searching keys allocated for a section search of multimedia data and at least two fine searching keys allocated for a fine section search of the multimedia data; and
a controller configured to:
divide a total reproducing time of the multimedia data into at least two sections in proportion to a number of the at least two searching keys;
divide a selected one of the at least two sections into at least two fine sections in proportion to a number of the at least two fine searching keys;
allocate reproducing positions of the multimedia data corresponding to the at least two sections to the at least two searching keys;
allocate reproducing positions of the selected one of the at least two sections of the multimedia data corresponding to the at least two fine sections to the at least two fine searching keys;
move reproducing time points of the multimedia data to a reproducing position allocated to one of the at least two searching keys when an input of the one of the at least two searching keys is received via the input unit;
move the reproducing time points in the selected one of the at least two sections an increment corresponding to a time unit smaller than a time unit of the selected one of the at least two sections when an input is received by one of the at least two fine searching keys; and
control a reproducing apparatus of the mobile communication terminal to display the reproducing positions,
wherein the at least two fine searching keys are separate from the at least two searching keys, and
wherein each of the divided sections is further divided into at least two fine sections.

2. The mobile communication terminal as claimed in claim 1, wherein the controller is further configured to receive input, via the input unit, for setting the reproducing positions of the multimedia data.

3. The mobile communication terminal as claimed in claim 1, wherein the at least two searching keys are number keys.

4. The mobile communication terminal as claimed in claim 1, further comprising a storage unit configured to store the multimedia data.

5. The mobile communication terminal as claimed in claim 4, wherein the storage unit comprises an internal memory or a detachable external memory.

6. The mobile communication terminal as claimed in claim 1, wherein the reproducing apparatus is configured to reproduce the multimedia data under the control of the controller.

7. The mobile communication terminal as claimed in claim 1, wherein the at least two fine searching keys comprise side keys provided at a side of a main body of the mobile communication terminal.

8. An operation control method of a mobile communication terminal, the method comprising:
dividing, by a controller of the mobile communication terminal, a total reproducing time of multimedia data into at least two sections in proportion to a number of at least two searching keys of an input unit of the mobile communication terminal;
dividing, by the controller, a selected one of the at least two sections into at least two fine sections in proportion to a number of at least two fine searching keys of the input unit of the mobile communication terminal;
allocating, by the controller, reproducing positions of the multimedia data corresponding to the at least two sections to the at least two searching keys;
allocating, by the controller, reproducing positions of the selected one of the at least two sections of the multimedia data corresponding to the at least two fine sections to the at least two fine searching keys;
moving, by the controller, reproducing time points of the multimedia data to a reproducing position allocated to one of the at least two searching keys to reproduce the multimedia data when an input is received by one of the at least two searching keys;
moving, by the controller, the reproducing time points in the selected one of the at least two sections an increment corresponding to a time unit smaller than a time unit of the selected one of the at least two sections when an input is received by one of the at least two fine searching keys; and controlling, by the controller, a reproducing apparatus of the mobile communication terminal to display the reproducing positions, wherein the at least two searching keys are allocated for a section search of the multimedia data, wherein the at least two fine searching keys are allocated for a fine section search of the selected section, and wherein the at least two fine searching keys are separate from the at least two searching keys.

9. The operation control method of claim 8, further comprising receiving, via the input unit, input for setting the reproducing positions of the multimedia data.

10. The operation control method of claim 8, wherein the at least two searching keys are number keys.

11. The operation control method of claim 8, wherein the at least two fine searching keys are side keys provided at a side of a main body of the mobile communication terminal.

12. The operation control method of claim 8, further comprising controlling, via the controller, a storage unit of the mobile terminal to store the multimedia data.

* * * * *